June 24, 1941. W. H. SAYRE 2,246,898
NONSLIP WEAR-RESISTANT TREAD
Filed April 16, 1938
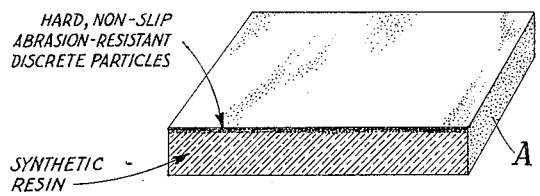
Fig. 1 — Fig. 2
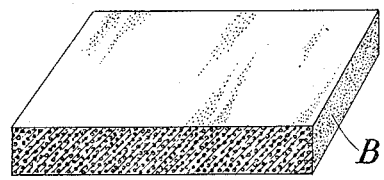
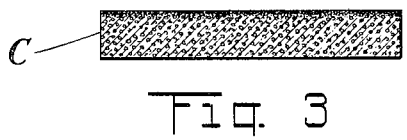
Fig. 3 — Fig. 4
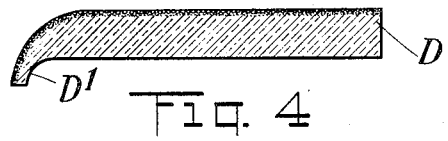
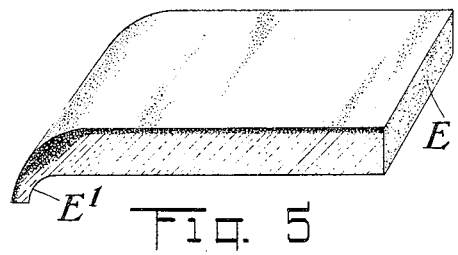
Fig. 5 — Fig. 6
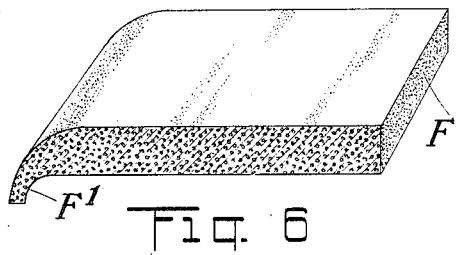
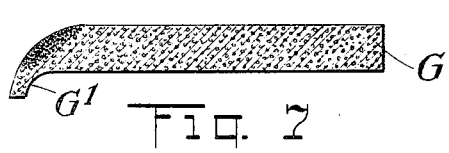
Fig. 7 — Fig. 8
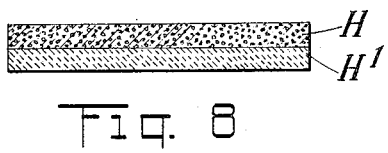
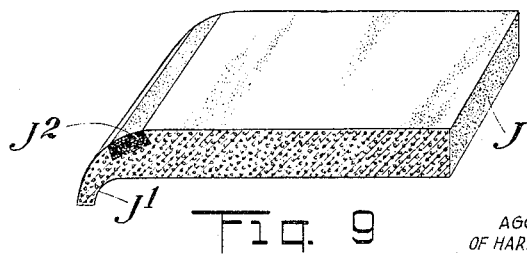
Fig. 9 — Fig. 10
AGGREGATES OF HARD, NON-SLIP ABRASION-RESISTANT DISCRETE PARTICLES
INVENTOR
W. H. Sayre
BY
Morrison, Kennedy, Campbell
ATTORNEYS Patented June 24, 1941

2,246,898

UNITED STATES PATENT OFFICE 2,246,898

NONSLIP WEAR-RESISTANT TREAD

William H. Sayre, Essex Fells, N. J., assignor to American Abrasive Metals Company, a corporation of New York Application April 16, 1938, Serial No. 202,581

1 Claim. (Cl. 94—5)

This invention relates to non-slip wear-resistant treads, such as are used on floors (as tiles), stairs, steps, running boards of automobiles and buses, car platforms, elevators and elevator landings, and the like, the expression "tread" being intended to embrace any form of article intended for tread wear.

The general objects of the invention are to provide treads simple and inexpensive to manufacture, easy to install, light in weight and yet of durable construction, sound-deadened, attractive and ornamental in appearance, susceptible of production to give lustrous, brilliant highly polished surface effects as well as translucent or transparent and variegated uniform or mottled color effects for decorative purposes, non-inflammable, having high electrical resistance, highly resistant to moisture, alkalies, acids, solvents and other organic chemicals, and still possessing great resistance to abrasive wear and a marked degree of non-slip efficiency even when wet.

In attaining these and other objects, the invention provides, as a basically new proposition, a tread comprising a hard synthetic resin body with a wear-resistant and non-slip tread surface. More specifically, the synthetic resin body is formed with a tread surface presenting substantially harder non-slip abrasion-resistant discrete particles embedded in and firmly bonded to the body material.

In forming such a tread surface, the non-slip abrasion-resistant particles, prior to the molding or shaping and heat-hardening operation, may be distributed uniformly throughout the synthetic resin body or localized in the tread surface thereof, being treated with a suitable bonding material prior to incorporation in the synthetic resin body. In most instances, it will be found to be desirable to concentrate the particles in the exposed or wearing surface of the tread, and in many instances to effect an even greater concentration of the particles at the place of most severe abrasion, as for instance the nosing of a stair tread.

A "synthetic resin" may be defined as an artificially produced solid, or semi-solid, complex, amorphous mixture of organic substances having no definite melting point and showing no tendency to crystallize, being characterized not by any definite chemical composition, but rather by certain physical properties, such as a typical luster and fracture.

To render it suitable for the intended purpose, the synthetic resin body is compounded to be insensitive to shock fracture and to be substantially free from "cold-flow" under normal service conditions. In other words, while the synthetic resin body is hard and rigid enough to hold the harder non-slip abrasion-resistant particles firmly in place and to avoid excessive "cold-flow" under the impact of ordinary pedestrian traffic, the body is nevertheless sufficiently plastic to conform to minor irregularities in the flooring or base on which it is mounted and to absorb the shocks or vibrations to which it may be subjected in use. By varying the compounds or compositions, the synthetic resin bodies may be adapted to practically any service condition encountered in the use of a tread.

It will be seen, therefore, that the invention not only opens up an entirely new field of application for synthetic resins, but in addition, it creates a new article of manufacture for tread wear which combines all the attributes of prior art treads (such as those made from metal, ceramics, rubber and cement) and possesses other attributes totally lacking in prior art treads. The synthetic resin composition is particularly suitable as a matrix for the hard discrete particles, providing for an intimate complete strong bond between the particles and the body in which they are embedded or dispersed, and thus yielding treads with correspondingly greater resistance to slipping and to abrasive wear than is possible with prior art materials.

In carrying out the invention, the synthetic resin compositions employed are composed of both a thermo-plastic or permanently fusible type and a thermo-setting or permanently infusible (after treatment) type. While thermoplastic and thermo-setting resins are not sharply defined and absolutely differentiated, tending gradually to merge into each other with the dividing line determined by the definition of the term "infusible," they are generally understood as having the traditional meaning indicated. Thus, in general, the products of polymerization such as the vinyl and styrene compounds have been classified as thermo-plastic resins, which are permanently capable of deformation under heat and pressure, although they may be adequately rigid for many practical applications at normal temperatures and under ordinary conditions of stress, while on the other hand, the products of condensation, such as phenol-formaldehyde, urea-formaldehyde and phthalic anhydride-glycerin derivatives, have been classified as thermo-setting resins which undergo further chemical changes and finally become permanently infusible by the action of heat.

It is proposed to employ a mixture of thermoplastic and thermo-setting resins with or without other modifying or plasticizing agents. The ratio of thermo-plastic to thermo-setting resin may be varied according to the kind of service to which the tread is to be subjected and the extent to which the synthetic resin body is compounded with the hard non-slip abrasion-resistant particles or with other types of fillers in company with said particles. In general, an increase in the ratio of the thermo-plastic resin increases the plasticity of the finished tread; and by varying the ratio of the thermo-setting resin, it is possible to control the final hardness of the tread body or the rate at which the surface of the finished tread will be worn away in service.

When both thermo-plastic and thermo-setting resins are employed, they may simply be components of a physical mixture, or they may be made to react during the heating process to form a new chemical compound or compounds. Thus, the desired synthetic resin body will comprise a mixture of thermo-plastic and thermo-reactive synthetic products.

Aside from the hard non-slip abrasion-resistant particles, the synthetic resin body may also be compounded with powdered fillers, fibrous materials, dyes, pigments, lubricants, plasticizers, modifying agents and thermo-plastic organic fillers, such as cellulose acetate, cellulose nitrate, and shellac. In this way, it is possible to adapt the improved treads to the different requirements of use.

To secure a satisfactory non-slip and wear-resistant efficiency, the hard discrete particles may be of any suitable size say a coarse size of 16 mesh or a finer size of 150 mesh, or mixtures of intermediate sizes. While the particles may be produced from natural mineral materials, such as emery or corundum, I prefer to use artificial particles, such as crystalline aluminum oxide, one commercial grade of which is known as "alundum," or crystalline silicon carbide, one commercial grade of which is known as "carborundum." If desired, and in some instances as preferred, the hard discrete particles may be bonded into larger discrete particles or aggregates by a vitrified ceramic material.

In providing for a strong bond between the hard discrete particles (whether in the form of individual grains or vitrified ceramic aggregates) and the synthetic resin body, the particles may be incorporated without preliminary treatment directly in the resin composition, whether it be a dry powder or a plastic paste mixture of resin with one or more plasticizers and with or without certain drying oils or other modifiers. A good bond may also be produced by wetting the particles with water or with plasticizers or other organic liquids compatible with the resin composition, prior to the incorporation of the particles therein. But it is preferred to wet the particles, prior to their incorporation, with a liquid thermo-reactive resin and then add a dry powdered thermo-reactive resin until the mixture consists of individual particles thoroughly coated with dry powder. In this condition, the particles can be easily poured and readily incorporated in the final synthetic resin composition which is to serve as the tread body.

The liquid thermo-reactive resin may consist of a phenolaldehyde condensation product, resulting from the discontinuation of the reaction before it has proceeded to the point of solidification; or it may be a polybasic acid-glycerol condensation product, or one obtained from urea and its derivatives with aldehydes.

After the hard discrete particles have been incorporated in the synthetic resin composition as compounded for the final tread body, the mix may then be molded or shaped and heat-hardened to produce the final product. During the heating operations, the originally wetted particles become completely and firmly bonded with the surrounding resin matrix on account of the chemical reaction between the liquid resin coating and the resin matrix. A particularly good bond may be had with vitrified ceramic aggregates which, because of their porous structure, freely absorb the liquid thermo-reactive resin in the preliminary coating operation.

In certain instances the compounded synthetic resin mixtures, in the form of sheets, powder or preformed panels, may be molded directly under heat and pressure to produce the final treads, or alternatively, the mixtures may be first shaped at room temperature under very high pressures and then hardened by baking at relatively high heat to produce the final treads.

When it is desired to secure a high concentration of the hard non-slip abrasion-resistant discrete particles in the upper or wearing surface of the tread, this may be accomplished by distributing, mechanically or otherwise, over the top surface of the panel, prior to molding or baking, an excess of said particles. To facilitate this operation, it may be desirable preliminarily to soften the surface of the panel by heat or by chemical treatment, as by washing with a suitable solvent. Then the tread panel, bearing the excess of particles on its upper softened surface, may be passed between rollers which will act to press the particles deeply into the synthetic resin matrix. With the hard particles thus embedded in the synthetic resin matrix, the latter may then be molded or baked to produce the final tread, which, though exhibiting a smooth finished surface, will possess the requisite non-slip wear-resistant property because of the high concentration of the hard discrete particles in the tread surface.

Another method of obtaining the high concentration of said particles in the wearing surface of the tread is to place a preformed panel in an open mold, cover the upper surface of the panel with an excess of the particles and then mold under pressure at an elevated temperature, the molding pressure serving to embed the particles deeply into the resin matrix.

Referring now to the drawing:

Fig. 1 is a perspective view of a simple form of tread A (such as would be suitable as a floor tile), showing a layer of the hard non-slip abrasion-resistant discrete particles embedded only in the upper or tread surface of the synthetic resin body.

Fig. 2 is a perspective view of a modified form of tread B showing the particles distributed throughout the synthetic resin body. In this form, the particles will not only provide a non-slip wear-resistant tread surface at the outset, but will continue to present such a tread surface as the tread wears away in use.

Fig. 3 is a cross-section of a second modified form of tread C, which differs from the tread B shown in Fig. 2 in having a greater concentration of the particles in the tread surface.

Fig. 4 is a cross-section of a conventional form of stair tread D with a depending edge or nosing $D^1$. In this instance, the particles are embedded only in the tread surface of the synthetic resin body, being present in the nosing as well as in the main body of the tread.

Fig. 5 is a cross-section of a modified form of tread E, which differs from the tread D shown in Fig. 4 in having a greater concentration of the particles in the nosing E¹ at the place of most severe abrasion.

Fig. 6 is a cross-section of a second modified form of stair tread F with a nosing F¹, characterized in that the particles are distributed throughout the synthetic resin body.

Fig. 7 is a cross-section of a third modified form of stair tread G, which differs from the tread F in Fig. 6 in having a greater concentration of the particles in the nosing G¹ at the place of most severe abrasion.

Fig. 8 is a cross-section of a simple form of tread H similar to the tread B shown in Fig. 2, but mounted on a sound-deadening base H¹. While the base H¹ may be composed of rubber or some other suitable sound-deadening material and secured to the heat-hardened tread body, as by a suitable cement or thermo-plastic bond, it is preferably made from a synthetic resin composition different from that of the tread body and the two permanently united by means of an adhesive or by means of a thermo-plastic or thermo-setting bond. For example, the base could be composed essentially of a thermo-plastic resin.

Fig. 9 is a cross-section of a fourth modified form of stair tread J, which differs from the tread G shown in Fig. 7 in that the nosing J¹ has an insert J² containing the greater concentration of the hard discrete particles. This insert, if desired, may be made of metal (such as cast iron, aluminum, brass or lead) and molded to the tread body, or the two may be separately formed and then put together to produce the final unit, with the insert detachable or non-detachable. Preferably, however, the insert is made from a synthetic resin composition different from that which comprises the tread body and the two permanently united by means of an adhesive or by means of a thermoplastic or thermo-setting bond. For example, the insert could be composed essentially of a thermo-setting resin.

Fig. 10 is a perspective view of a simple form of tread K showing the individual non-slip abrasion-resistant particles bonded by a vitrified ceramic material into larger particles or aggregates, which in turn are bonded to the synthetic resin body, being in this instance distributed throughout the body.

There are, of course, other types of treads and other ways in which the tread surfaces of the synthetic resin bodies may be rendered non-slip and wear-resistant. There are likewise various synthetic resin compositions and various types of non-slip abrasion-resistant particles which may be used in producing the new treads. The examples given above and the methods of procedure outlined are intended merely to be by way of illustration. It should be understood, therefore, that the invention is not limited in any respect except insofar as such limitations are specified in the appended claim.

Having thus described my invention, what I claim is:

A non-slip wear-resistant tread comprising a hard synthetic resin body compounded of thermo-plastic and thermo-setting resins and having abrasion-resistant discrete particles embedded therein, said tread being highly resistant to moisture, capable of withstanding shocks and vibrations and substantially free from "cold-flow" under normal service conditions.

WILLIAM H. SAYRE.